US00RE44152E

(19) United States
(12) Reissued Patent
Maruyama et al.

(10) Patent Number: US RE44,152 E
(45) Date of Reissued Patent: Apr. 16, 2013

(54) RECORDING-MATERIAL TYPE DETERMINATION APPARATUS AND METHOD AND IMAGE FORMING APPARATUS

(75) Inventors: Shoji Maruyama, Shizuoka (JP); Masanori Akita, Chiba (JP)

(73) Assignee: Canon Kabushiki Kaisha, Tokyo (JP)

(21) Appl. No.: 12/203,464

(22) Filed: Sep. 3, 2008

Related U.S. Patent Documents

Reissue of:
(64) Patent No.: 6,801,727
Issued: Oct. 5, 2004
Appl. No.: 10/409,137
Filed: Apr. 9, 2003

U.S. Applications:
(63) Continuation of application No. 11/104,643, filed on Apr. 13, 2005, now Pat. No. Re. 41,778.

(30) Foreign Application Priority Data

Apr. 12, 2002 (JP) ..... 2002-109922

(51) Int. Cl.
*G03G 15/00* (2006.01)

(52) U.S. Cl.
USPC ..... 399/45; 399/53; 399/66; 399/67; 400/703; 400/708; 356/601

(58) Field of Classification Search ..... 399/45, 399/53, 66–68; 400/703, 708; 356/601
See application file for complete search history.

(56) References Cited

U.S. PATENT DOCUMENTS 5,109,236 A 4/1992 Watanabe et al. ..... 346/76 PH
5,654,799 A 8/1997 Chase et al. ..... 356/371
(Continued)

FOREIGN PATENT DOCUMENTS

EM 1 215 878 A2 6/2002
EM 1 308 798 A2 5/2003
(Continued)

OTHER PUBLICATIONS

Official Letter/Search Report, dated Feb. 2, 2009, issued by the European Patent Office, in European Application No. 03008361.2.

(Continued)

*Primary Examiner* — David Gray
*Assistant Examiner* — Gregory H Curran
(74) *Attorney, Agent, or Firm* — Fitzpatrick, Cella, Harper & Scinto

(57) ABSTRACT

To provide a recording-material type determination apparatus and recording-material type determination method which can determine the type of recording material using simple calculations as well as to provide an image forming apparatus capable of obtaining stable image quality independent of the type of recording material using the apparatus and method. Based on data read by a read unit which reads surface images of recording material, a first calculation unit calculates the depth of irregularities in the surface of recording material and stores the results of calculation in a register A while a second calculation unit calculates the spacing of irregularities on the surface of the recording material and stores the results of calculation in a register B. Based on the values in the registers A and B, the type of recording material such as gloss paper, plain paper, rough paper or OHT is determined.

23 Claims, 9 Drawing Sheets

U.S. PATENT DOCUMENTS

| | | | | |
|---|---|---|---|---|
| 5,689,757 | A | 11/1997 | Ferrante et al. | 399/45 |
| 5,734,742 | A | 3/1998 | Asaeda et al. | 382/141 |
| 6,215,552 | B1 | 4/2001 | Acquaviva et al. | 356/371 |
| 6,477,892 | B1 | 11/2002 | Lindig | 73/105 |
| 6,504,617 | B2 * | 1/2003 | Komulainen et al. | 356/600 |
| 6,577,826 | B1 * | 6/2003 | Misaizu et al. | 399/45 |
| 6,629,452 | B2 | 10/2003 | Lindig | 73/105 |
| 6,668,144 | B2 | 12/2003 | Maruyama | 399/45 |
| 6,684,048 | B2 | 1/2004 | Caruthers et al. | 399/296 |
| 6,731,886 | B2 | 5/2004 | Takeda | 399/45 |
| 6,801,727 | B2 | 10/2004 | Maruyama et al. | |
| RE41,778 | E | 9/2010 | Maruyama et al. | |
| 2002/0071688 | A1 | 6/2002 | Maruyama | 399/45 |
| 2003/0194251 | A1 | 10/2003 | Maruyama et al. | |

FOREIGN PATENT DOCUMENTS

| | | |
|---|---|---|
| JP | 62-46805 | 10/1987 |
| JP | 4-80771 | 3/1992 |
| JP | 07-103752 | 4/1995 |
| JP | 7-103752 | 4/1995 |
| JP | 8-86633 | 4/1996 |
| JP | 08-292158 | 11/1996 |
| JP | 9-286155 | 11/1997 |
| JP | 11-27103 | 1/1999 |
| JP | 11-271103 | 1/1999 |
| JP | 11-148813 | 6/1999 |
| JP | 11-271037 | 10/1999 |
| JP | 2000-241146 | 9/2000 |
| JP | 2001-88275 | 4/2001 |
| JP | 2001-183124 | 7/2001 |
| JP | 2003-302208 | 10/2003 |

OTHER PUBLICATIONS

European Office Action in European Application No. 03008361.2 mailed Oct. 22, 2010.

Official Communication issued on May 13, 2011, by the European Patent Office, in European Patent Application No. 11156229.4.

* cited by examiner

RECORDING-MATERIAL TYPE DETERMINATION APPARATUS AND METHOD AND IMAGE FORMING APPARATUS

Matter enclosed in heavy brackets [ ] appears in the original patent but forms no part of this reissue specification; matter printed in italics indicates the additions made by reissue.

*A continuation of this continuation reissue application was filed on Aug. 27, 2012, and assigned application Ser. No. 13/595,091.*

*This application is a continuation of U.S. patent application Ser. No. 11/104,643, filed Apr. 13, 2005, which is a Reissue application of U.S. Pat. No. 6,801,727 B2, issued Oct. 5, 2004.*

BACKGROUND OF THE INVENTION

1. Field of the Invention

The present invention relates to a recording-material type determination apparatus, recording-material type determination method, and image forming apparatus such as a copier or laser printer which controls imaging conditions using the recording-material type determination apparatus.

2. Related Background Art

An image forming apparatus such as a copier or laser printer comprises a latent-image bearing member which bears a latent image, a developing apparatus which visualizes the latent image as a developer image (developed image) by applying developer to the latent-image bearing member, transferring means which transfers the developer image formed by the developing apparatus to recording material conveyed in a predetermined direction, and a fixing apparatus which fixes the developer image on the recording material by applying heat and pressure to the recording material under predetermined fixing conditions after the developer image has been transferred to the recording material by the transferring means.

Conventionally, such an image forming apparatus controls to set fixing conditions (e.g., fixing temperature and conveying speed of the recording paper passing through the fixing apparatus) according to user settings after the user sets a size and type (also called a paper type) of the recording paper, which is recording material, on a control panel or the like installed, for example, on the image forming apparatus main body.

Alternatively, an image forming apparatus incorporates a sensor for determining recording material and controls developing conditions, fixing conditions or transfer conditions variably according to the type of recording material.

In the latter case, in particular, Japanese Patent Application Laid-Open No. 11-27103, for example, proposes a technique for picking up a surface picture of recording material using a CCD sensor, converting it into fractal dimension information, and thereby detecting the surface flatness of the recording material.

However, the image forming apparatus has the following problems.

1) When calculations are performed using fractal dimensions, picture information is binarized according to a certain threshold and the number of black pixels is counted based on the binarized information. Then, the picture information is visualized roughly and binarized similarly and the number of black pixels is counted again based on the binarized information. This process is repeated several times, taking a very long calculation time.

Therefore, especially if surface flatness varies widely within one sheet of recording material, video images of a plurality of points on the recording material need to be detected. In such a case, it takes time to detect the surface flatness of the recording material, reducing the throughput (the number of prints per unit time) of the image forming apparatus 2) The calculation method, if implemented by a hardware circuit, will increase the scale of the circuit, reducing the cost-effectiveness of the image forming apparatus significantly.

3) Furthermore, if implemented by a software, the calculation method, which binarizes captured images and performs calculation, binarizes the resulting images and performs calculation, and so on, requires a memory (RAM) to buffer the captured images and the images resulting from calculations. Especially if a sensor with increased pixel counts is used to improve detection accuracy, the buffer memory will increase in size, reducing the cost-effectiveness of the image forming apparatus significantly.

SUMMARY OF THE INVENTION

The present invention has been made in view of the above circumstances. Its object is to provide a recording-material type determination apparatus and recording-material type determination method which can determine the type of recording material (i.e., determine the flatness of recording material) using simple calculations as well as to provide an image forming apparatus capable of obtaining stable image quality independent of the type of recording material using the apparatus and method.

Another object of the present invention is to provide a recording material type determination apparatus comprising: a light emit unit, adapted to illuminate a surface of recording material; a read unit, adapted to read an illuminated region on the surface of the recording material as a video image; a first calculation unit adapted to calculate information about depth of irregularities in the surface of the recording material based on video information read by the read unit; a second calculation unit adapted to calculate information about spacing of irregularities on the surface of the recording material based on the video information read by the read unit; and a determination unit adapted to determine a type of recording material based on calculation results produced by the first calculation unit and the second calculation unit.

Yet another object of the present invention is to provide a recording-material type determination apparatus comprising: an input unit adapted to input a video image of a surface of recording material; a first calculation unit adapted to calculate information about depth of irregularities in a surface of the recording material based on video information inputted in the input unit; a second calculation unit adapted to calculate information about spacing of irregularities on the surface of the recording material based on the video information inputted in the input unit; and a determination unit adapted to determine a type of recording material based on calculation results produced by the first calculation unit and the second calculation unit.

Yet another object of the present invention is to provide a recording-material type determination method comprising: a read step of reading a surface of recording material as a video image; a first calculation step of calculating information about depth of irregularities in the surface of the recording material based on results of the read step; a second calculation step of calculating information about spacing of irregularities on the surface of the recording material based on the results of the read step; and a determination step of determining a type of recording material based on calculation results produced in the first calculation step and the second calculation step.

Yet another object of the present invention is to provide an image forming apparatus comprising: a conveyor adapted to convey recording material; an image forming unit which forms an image on the recording material conveyed by the conveyor; a light emit unit, adapted to illuminate a surface of recording material; a read unit, adapted to read an illuminated region on the surface of the recording material as a video image; a first calculation unit adapted to calculate information about depth of irregularities in the surface of the recording material based on video information read by the read unit; a second calculation unit adapted to calculate information about spacing of irregularities on the surface of the recording material based on the video information read by the read unit; a determination unit adapted to determine a type of recording material based on calculation results produced by the first calculation unit and the second calculation unit; and a controller which controls image forming conditions of the image forming unit based on the type of recording material determined by the determination unit.

Other objects, features and advantages of the present invention will become readily apparent from the following detailed description taken in conjunction with the accompanying drawings.

DESCRIPTION OF THE PREFERRED EMBODIMENTS

A preferred embodiment of the present invention will be described in detail below citing examples of a "recording-material type determination apparatus" and "image forming apparatus." Incidentally, the present invention can be implemented not only as apparatus, but also as methods, being backed up by the description of the examples.

EXAMPLES

Example 1

Figure 1:
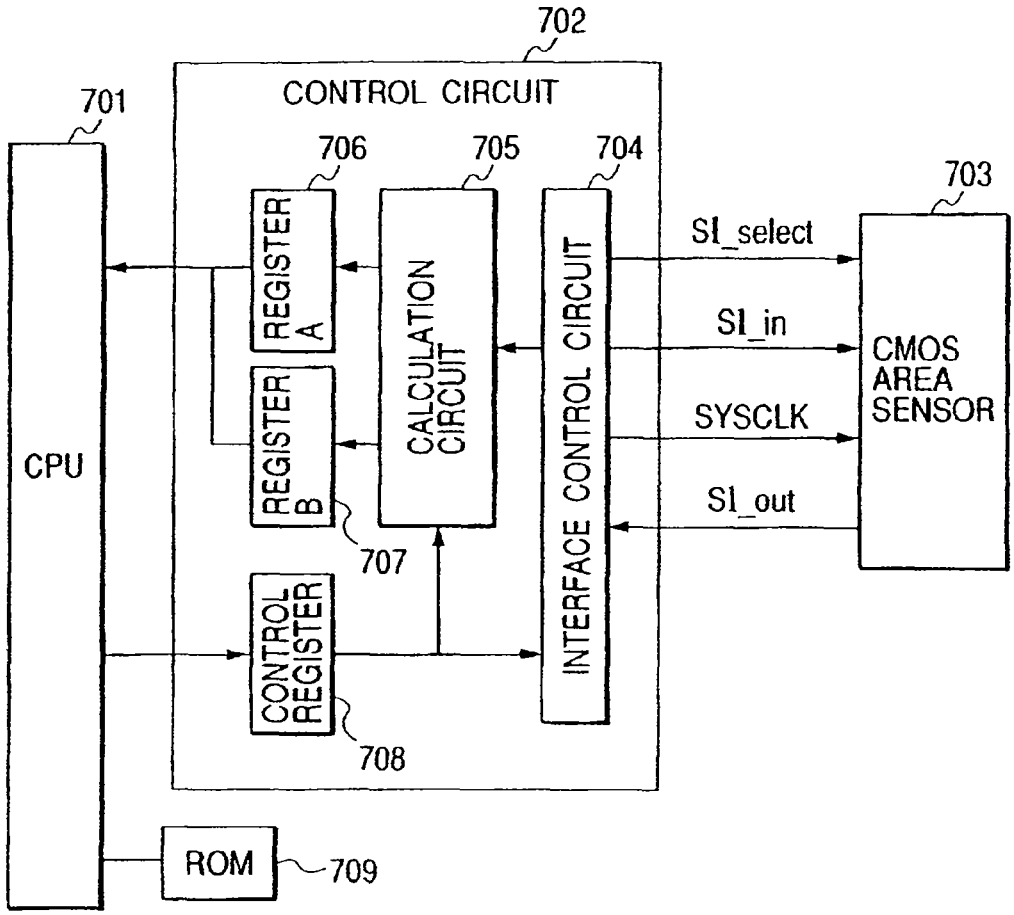
FIG. 1 is a block diagram showing configuration of a first example.

FIG. 1 is a block diagram showing configuration of a "recording-material type determination apparatus" according to a first example.

First, with reference to FIG. 1, description will be given of a control circuit block which performs first calculation and second calculation and determines the type of recording material.

In the figure, reference numeral 701 denotes a CPU which serves as a determination part, 702 denotes a control circuit, 703 denotes a CMOS area sensor, 704 denotes an interface control circuit, 705 denotes a calculation circuit, 706 denotes a register A which stores results of calculation on the amount of irregularities in the surface of recording material carried out by first calculation means (means of calculating the depth of irregularities in the surface of recording material), 707 denotes a register B which stores results of calculation on the edge amount of irregularities in the surface of recording material carried out by second calculation means (means of calculating the spacing of irregularities on the surface of recording material), 708 denotes a control register. Reference numeral 709 denotes a ROM (memory part) which prestores programs to be executed by the CPU 701 as well as reference information about various recording materials (described later).

Operation will be described next. When the CPU 701 instructs the control register 708 to operate the CMOS area sensor 703, the CMOS area sensor 703 starts picking up (taking) a picture of the recording material. In other words, the CMOS area sensor 703 starts to accumulate charge.

The CMOS area sensor 703 is selected at SL_select sent by the interface control circuit 704, SYSCLK is generated at a predetermined time, and digital image data picked up is transmitted by the CMOS area sensor 703 using an SL_out signal.

The imaging data received via the interface control circuit 704 is calculated by the calculation circuit 705 in the control circuit 702 using a first calculation method described later and the results are stored in the register A 706 as the amount of irregularities in the surface of the recording material.

The imaging data received via the interface control circuit 704 and calculated by the calculation circuit 705 in the control circuit 702 using a second calculation method described later is stored in the register B 707 as the edge amount of irregularities in the surface of the recording material. The CPU 701 judges the type of recording material based on the values of the two registers A and B.

Figure 2:
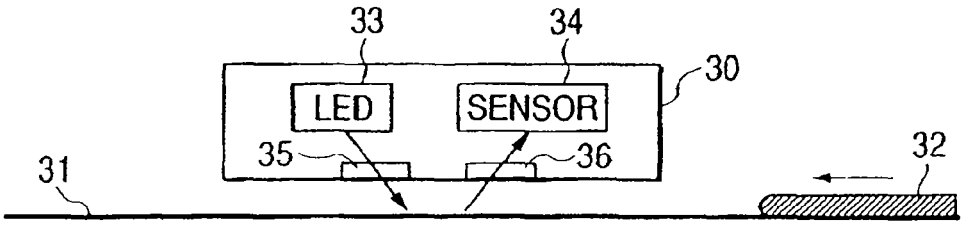
FIG. 2 is a diagram showing schematic configuration of an image sensor.
Figure 3A:
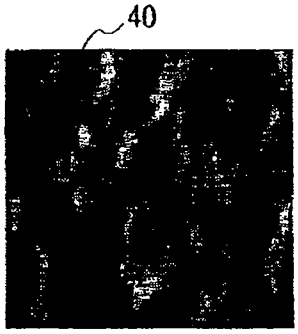
FIGS. 3A, 3B, 3C, 3D, 3E and 3F are diagrams showing surface images of recording materials.
Figure 3B:
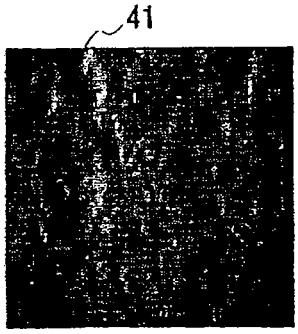
Figure 3C:
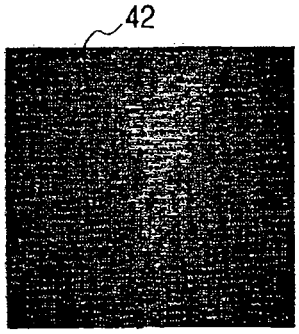
Figure 3D:
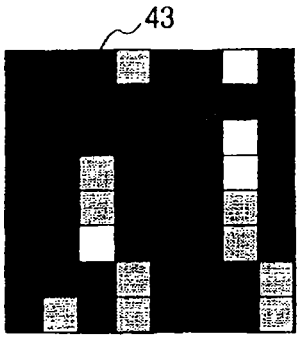
Figure 3E:
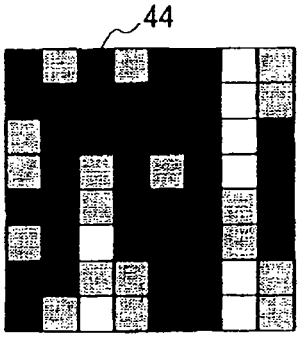
Figure 3F:
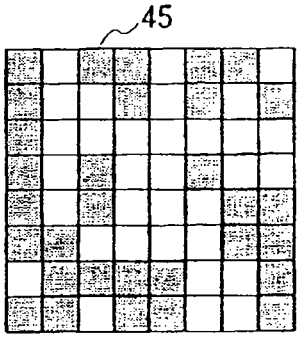

Next, the CMOS area sensor 703 serving as an image sensor will be described with reference to FIG. 2.

In the figure, reference numeral 30 denotes a sensor unit, 31 denotes a recording-paper convey guide, 32 denotes recording material, 33 denotes an LED serving as lighting means, 34 denotes a CMOS area sensor, and 35 and 36 denote lenses.

Light from the LED light source illuminates the surface of the convey guide 31 or the surface of the recording material 32 via the lens 35.

Reflected light from the recording material 32 is collected via the lens 36 and is focused onto the CMOS area sensor 34 to allow a surface image to be read from the recording-paper convey guide 31 or recording material 32. At this time, the LED 33 is placed in such a way that its light will fall on the surface of the recording material at an oblique angle as shown in the figure.

Reference numerals 43 to 45 in FIGS. 3A to 3F denote images resulting from digital processing of surface images read by the 8×8 pixels CMOS area sensor 34 from the recording material. The digital processing consists of converting analog output of a sensor part of the CMOS area sensor 34 into 8-bit pixel data by means of A/D conversion.

Reference numeral 40 denotes recording material A, so-called rough paper, whose surface fibers are relatively rough.

Reference numeral 41 denotes recording material B, so-called plain paper, which is in common use. Reference numeral 42 denotes an enlarged view of a surface of recording material C, so-called gloss paper, whose fibers have been compressed adequately. These images, after being read by the CMOS area sensor and subjected to digital processing, result in the images 43 to 45.

In this way, surface images vary with the type of recording material. This is caused by differences in surface conditions of paper fibers. Specifically, raised fibers cast shadows when the paper surface is illuminated at an oblique angle whereas smooth fibers do not. The video images 43 to 45 are obtained as a result of this phenomenon.

Figure 4:
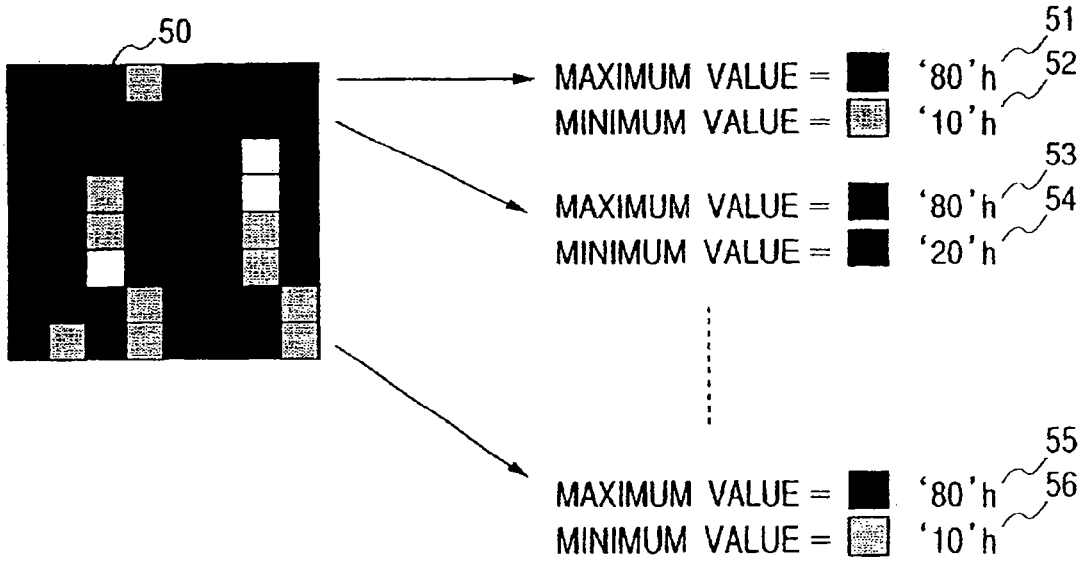
FIG. 4 is an explanatory diagram of first calculation means.

Next, with reference to FIG. 4, description will be given of how the calculation circuit 705 as first calculation means calculates the depth of irregularities in the surface of recording material (hereinafter referred to simply as the amount of irregularities). In FIG. 4, reference numeral 50 denotes an image obtained by digitally processing a video image of the surface of the recording material.

Analog data outputted from the sensor part of the CMOS area sensor is converted into 8-bit pixel data by means of A/D conversion. The 8-bit data is determined in proportion to the brightness of the image.

Reference numeral 51 denotes the darkest part in the first line of the 8×8 pixels. Its value is '80'h in the example of FIG. 4. Reference numeral 52 denotes the brightest part in the first line of the 8×8 pixels. Its value is '10'h in the example of FIG. 4. The difference between the two values is '80'h−'10'h='70'h.

Thus, the difference (contrast) between the maximum value and minimum value in the first line is '70'h.

Similarly, reference numeral 53 denotes the darkest part in the second line. Its value is '80'h. Reference numeral 54 denotes the brightest part in the second line. Its value is '20'b. The difference is '80'h−'20'h='60'h.

Reference numeral 55 denotes the darkest part in the eighth line. Its value is '80'h. Reference numeral 56 denotes the brightest part in the eighth line. Its value is '10'h. The difference is '80'h−'10'h='70'h.

The difference between the maximum value and minimum value is added for each line and the resulting value for all the lines is defined as the result of the calculation carried out by the first calculation means on the amount of irregularities in the surface of the recording material.

Figure 5:
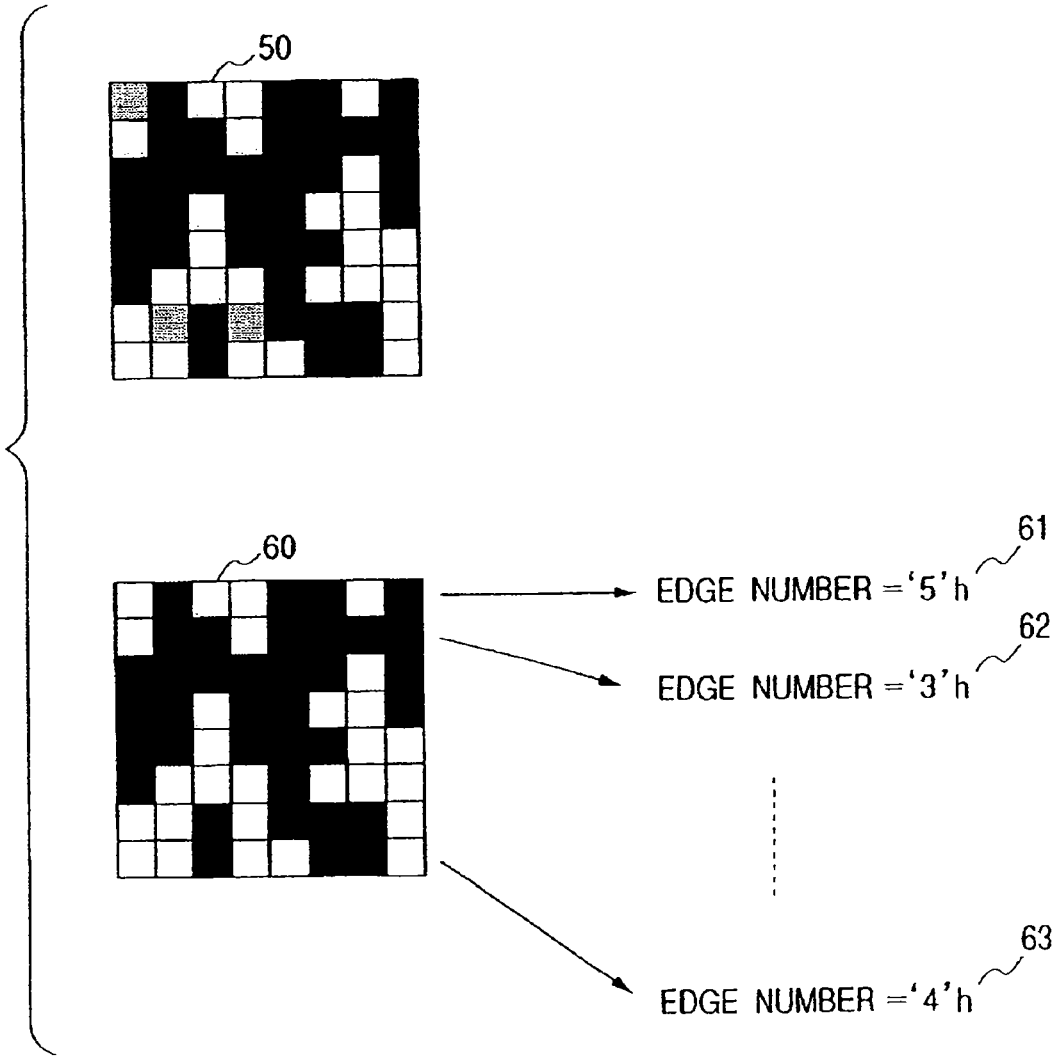
FIG. 5 is an explanatory diagram of second calculation means.

Next, with reference to FIG. 5, description will be given of how the calculation circuit 705 as second calculation means calculates the spacing of irregularities on the surface of the recording material (edge amount).

Reference numeral 50 denotes an image obtained by digitally processing the surface of the recording material. Reference numeral 60 denotes an image obtained by binarizing 8×8 pixels picked up at the next sampling time using, as a threshold, an average calculated from the image 50 picked up beforehand at the previous sampling time.

Edge numbers obtained as a result of binarization are as follows. Reference numeral 61 denotes the edge number in the first line, which is '05'h in this example. Reference numeral 62 denotes the edge number in the second line, which is '03'h in this example.

Similarly, reference numeral 63 denotes the edge number in the eighth line, which is '03'h in this example.

The edge number is counted for each line and the resulting value for all the lines is defined as the result of the calculation carried out by the second calculation means on the edge amount on the surface of the recording material.

Incidentally, the edge amount of irregularities is inversely proportional to the spacing of irregularities and in this example, information about the spacing of irregularities is obtained by calculating the edge amount.

The CMOS area sensor 703 will be described with reference to FIG. 6

Figure 6:
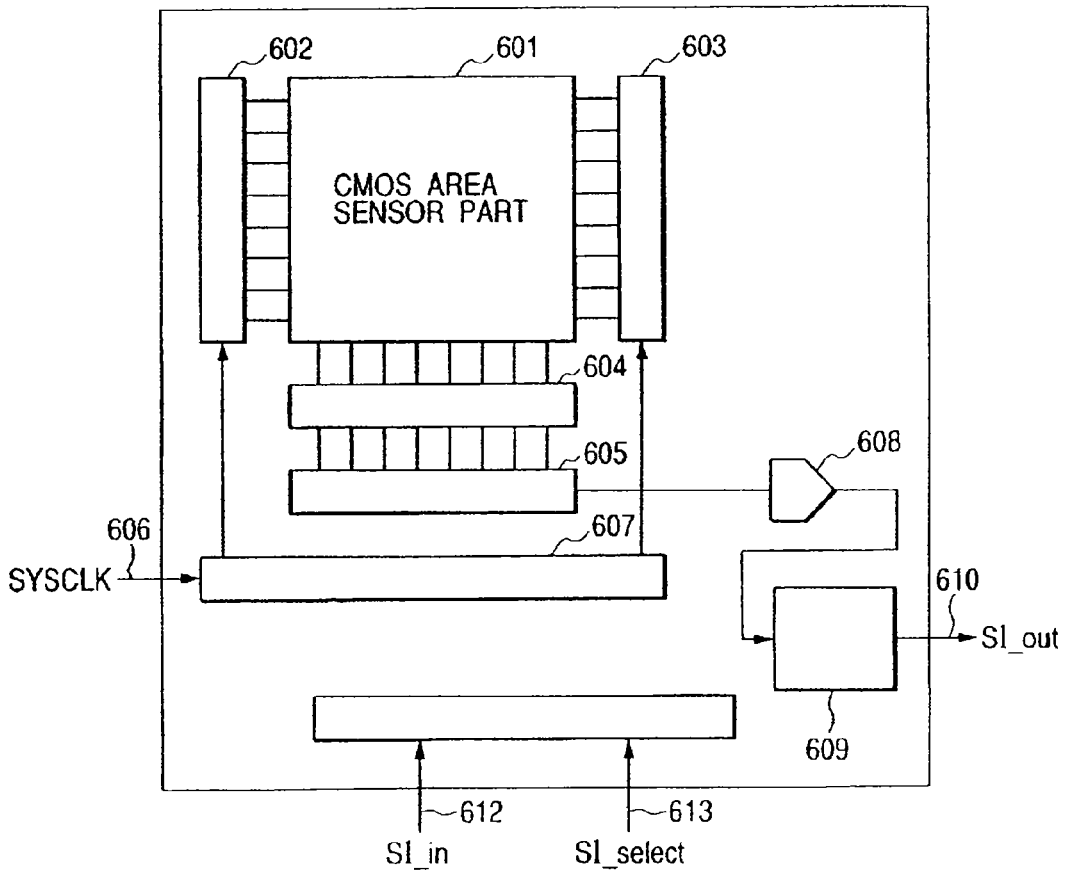
FIG. 6 is a block diagram showing circuit configuration of a CMOS area sensor.

FIG. 6 is a block diagram showing configuration of the CMOS area sensor 703. In the figure, reference numeral 601 denotes a CMOS area sensor part where, for example, sensors for 8×8 pixels are arranged in a matrix. Reference numerals 602 and 603 denote vertical shift registers, 604 denotes an output buffer, 605 denotes a horizontal shift register, 606 denotes a system clock, 607 denotes a timing generator.

Operation will be described next. When an SL_select signal 613 becomes active, the CMOS sensor part 601 starts accumulating charge based on received light. Next, when the system clock 606 is generated, the vertical shift registers 602 and 603 sequentially select columns of pixels to be read based on the timing generator 607 and put the data in the output buffer 604 in sequence.

The data placed in the output buffer 604 is transferred to an A/D converter 608 by the horizontal shift register 605. After digital conversion by the A/D converter 608, resulting pixel data is controlled with predetermined timing by an output interface circuit 609 and outputted as the SL_out signal 610 during a period when the SL_select signal 613 is active.

On the other hand, a control circuit 611 can control A/D conversion gain variably using an SL_in signal 612. For example, if contrast of an image is not available, the CPU 701 can pick up the image always using the best contrast by changing gain.

Next, with reference to FIG. 7, description will be given of how the CPU 701 determines the type of recording material based on two register values.

Figure 7:
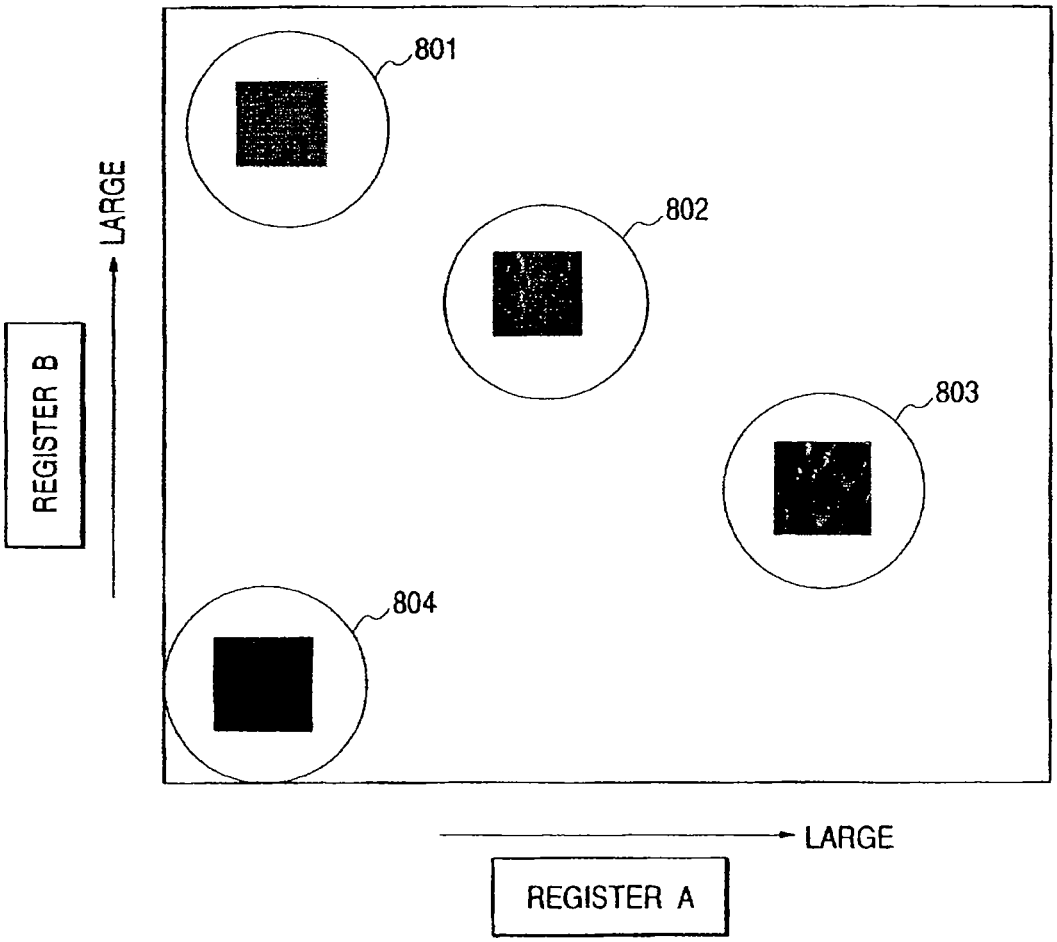
FIG. 7 is a diagram showing determination results of recording materials.

FIG. 7 is a diagram showing distribution of recording materials together with video images of their actual surfaces, wherein the horizontal axis represents the value of the register A, i.e., the result of calculation carried out by the first calculation means on the amount of irregularities in the surface of the recording material while the vertical axis represents the value of the register B, i.e., the result of calculation carried out by the second calculation means on the edge amount of irregularities in the surface of the recording material.

Reference numeral 801 denotes gloss paper, 802 denotes plain paper, 803 denotes rough paper, and 804 denotes OHT.

As shown in the figure, in the case of the gloss paper 801, which has high surface flatness, the value of the register A is small and the value of the register B is large.

In the case of the plain paper 802, the value of the register A is larger than that of the gloss paper 801 and the value of the register B is smaller than that of the gloss paper 801 as can be seen from the video image of its surface.

Similarly, the rough paper 803 has a larger register A value than the plain paper 802 and a smaller register B value than the plain paper 802.

On the other hand, since OUT is transparent, the black convey guide located below the OHT produces a dark image. Consequently, the values of both register A and register B are small and OHT occupies the position shown in FIG. 7.

Prescribed reference information about the amount of irregularities and the edge amount of irregularities of each recording material is prestored in the ROM (memory unit) 709 shown in FIG 1. The CPU 701 reads the value stored in the resister A and value stored in the resister B in sequence by sending a read signal to the control register and then determines the type of recording material by comparing these values with the reference information stored in the ROM (memory unit) 709.

In this way, the CPU 701 can detect surface characteristics, etc., of various recording materials by comparing the value of the register A, i.e., the result of calculation carried out by the first calculation means on the amount of irregularities in the surface of the recording material and the value of the register B, i.e., the result of calculation carried out by the second calculation means on the edge amount of irregularities on the surface of the recording material with the information stored in the ROM (memory unit) 709. Thus, it can determine recording material by distinguishing among gloss paper, plain paper, rough paper and OHT.

In particular, the use of the edge amount of irregularities makes it possible to distinguish between the gloss paper 801 and OHT 804.

Example 2

Figure 8:
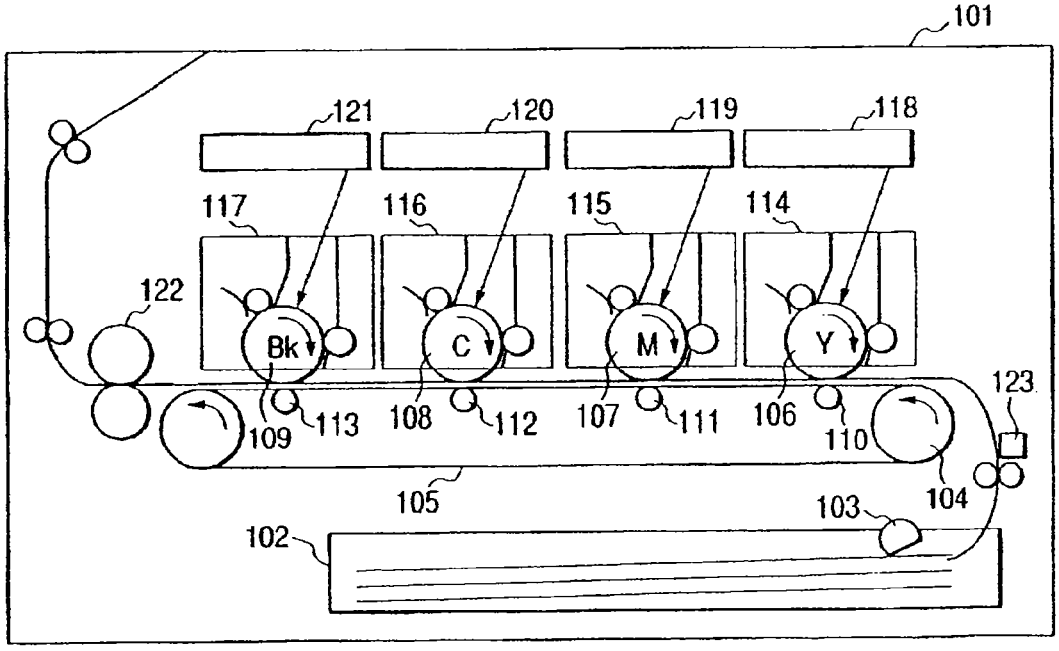
FIG. 8 is a sectional view showing schematic configuration of a second example.

FIG. 8 is a sectional view showing configuration of an "image forming apparatus" according to a second example. The recording-material type determination apparatus used in this example is the same as the first example, and thus its description will be quoted.

In FIG. 8, reference numeral 101 denotes an image forming apparatus; 102 denotes a paper cassette; 103 denotes a paper feeding roller; 104 denotes a transferring-belt driving roller; 105 denotes a transferring belt; 106 to 109 denote yellow, magenta, cyan and black photosensitive drums; 110 to 113 denote transferring rollers; 114 to 117 denote yellow, magenta, cyan and black cartridges; 118 to 121 denote yellow, magenta, cyan and black optical units; and 122 denotes a fixing unit.

Using an electrophotographic process, the image forming apparatus according to this example transfers yellow, magenta, cyan and black images onto recording paper by superimposing them and thermally fixes the toner images by a fixing roller under temperature control.

The optical units for individual colors scan the respective photosensitive drums by exposing their surface to a laser beam to form latent images. These scanning operations for forming images are synchronized so that images will be transferred from preset positions on conveyed recording paper.

Furthermore, the image forming apparatus comprises a paper feeding motor which feeds and conveys recording paper which is a recording material, transferring-belt driving motor which drives the transferring-belt driving roller, photosensitive-drum driving motor which drives the photosensitive drums for color inks and transferring roller, and fixing-roller driving motor which drives the fixing roller.

Reference numeral 123 denotes an image sensor which illuminates the surface of recording paper being fed and conveyed, collects and focuses the light reflected from the surface, and thereby detects an image of a specific area on the recording paper.

A control CPU (not shown) mounted on the image forming apparatus fuses and fixes the toner images on the recording paper by giving a desired quantity of heat to the recording paper using the fixing unit (part) 122.

Next, operation of the control CPU will be described with reference to FIG. 9.

Figure 9:
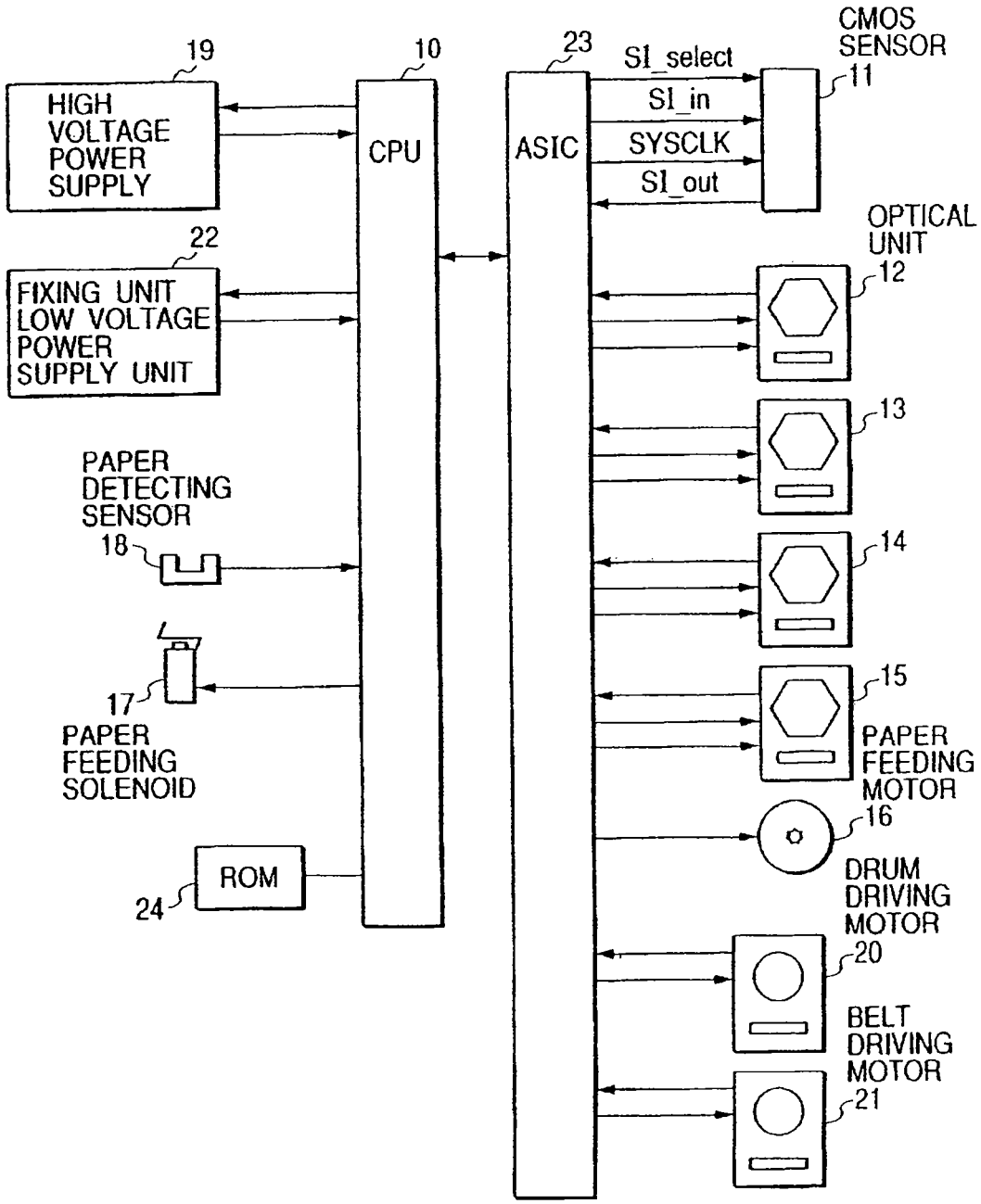
FIG. 9 is a control block diagram of the second example.

FIG. 9 shows composition of units (parts) controlled by the control CPU. In the figure, reference numeral 10 denotes a CPU; 11 denotes a CMOS sensor; 12 to 15 denote optical units which are equipped with a polygon mirror, motor and laser, and paint desired latent images by scanning the surfaces of photosensitive drums with a laser; 16 denotes a paper feeding motor which feeds recording paper; 17 denotes a paper feeding solenoid used to start a paper feeding roller for feeding recording material; 18 denotes a paper detecting sensor which detects whether or not recording material is placed in position; 19 denotes a high voltage power supply which controls primary electrification, developing, primary transfer and a secondary transfer bias needed for an electrophotographic process; 20 denotes a drum driving motor which drives the photosensitive drums and transferring roller; 21 denotes a belt driving motor which drives the transferring belt and fixing unit roller; and 22 denotes a fixing unit and low voltage power supply unit which monitors temperature and keeps fixing temperature constant using a thermistor (not shown) under the control of the control CPU. Besides, reference numeral 24 denotes a ROM (memory unit) which prestores programs to be executed by the CPU 10 as well as reference information about various recording materials.

Reference numeral 23 denotes an ASIC which controls the speed of motors in the CMOS sensor 11 and optical units 12 to 15 as well as the speed of the paper feeding motor under instructions from the control CPU 10.

To control the speed of the motors, tack signals from a motor (not shown) are detected and acceleration signals or deceleration signals are output to the motors such that the interval between the tack signals has a predetermined duration. Thus, it is advantageous to implement the control circuit as a hardware circuit using the ASIC 23 in that control loads on the CPU 10 can be reduced.

Upon receiving a print command from a host computer (not shown), the control CPU 10 makes the paper detecting sensor 18 judge whether or not recording material is present. If paper is present, the control CPU 10 drives the paper feeding motor 16, drum driving motor 20, belt driving motor 21 and paper feeding solenoid 17 to convey the recording material into position.

When the recording material is conveyed to the CMOS sensor 11, the control CPU 10 instructs the ASIC 23 to make the CMOS sensor 11 pick up an image (taking a picture of a surface). Consequently, the CMOS sensor 11 picks up a surface image of the recording material.

In so doing, the ASIC 23 sets SL_select (see FIG. 1) active, outputs a predetermined SYSCLK pulse at a predetermined time, and captures imaging data outputted from the CMOS sensor 11 using SL_out.

The gain of the CMOS sensor 11 is set as follows. When the control CPU 10 sets a predetermined value in a register in the ASIC 23, the ASIC 23 sets SL_select active, outputs a predetermined SYSCLK pulse at a predetermined time, and sets the gain of the CMOS sensor 11 using SL_in.

The ASIC 23 comprises circuits which serve as the first calculation means and the second calculation means described in the first example and calculation results produced by them are stored in registers in the ASIC 23.

The CPU 10 reads the registers in the ASIC 23, determines the type of the recording material which has been fed, and variably controls developing-bias conditions of the high voltage power supply 19 according to the determined type.

For example, if the recording material used is so-called rough paper whose surface fibers are relatively rough, the CPU 10 sets the developing bias to a lower value than in the case of plain paper to prevent scattering of toner by reducing the amount of toner sticking to the surface of the recording material. This is done to solve the problem of degradation in image quality caused by toner scattering from paper fibers especially in the case of rough paper whose surface tend to collect a large amount of toner.

Also, the CPU 10 determines the type of the recording material which has been fed, and variably controls transfer conditions of transferring means according to the determined type.

Also, the CPU 10 determines the type of the recording material which has been fed, and variably controls temperature conditions of the fixing unit 22 according to the determined type.

Especially in the case of OHT, this is effective in dealing with the problem that low fixability of the toner sticking to the recording material lowers the transparency of OHT.

Furthermore, the CPU 10 determines the type of the recording material which has been fed, and variably controls the conveying speed of the recording material according to the determined type. The variable control of the conveying speed is achieved as the CPU 10 sets the value of a speed control register in the ASIC 23.

Especially in the case of OHT or gloss paper, this is effective in increasing the fixability of the toner which sticks to the recording material, improving gloss, and thereby improving image quality.

Thus, according to this example, the ASIC-based hardware circuit performs first calculation and second calculation based on the surface image of the recording material picked up by the CMOS area sensor, and the CPU variably controls the developing conditions and transfer conditions of the high voltage power supply, controlled-temperature conditions of the fixing unit, or conveying speed of the recording material based on the calculation results.

Example 3

Figure 10:
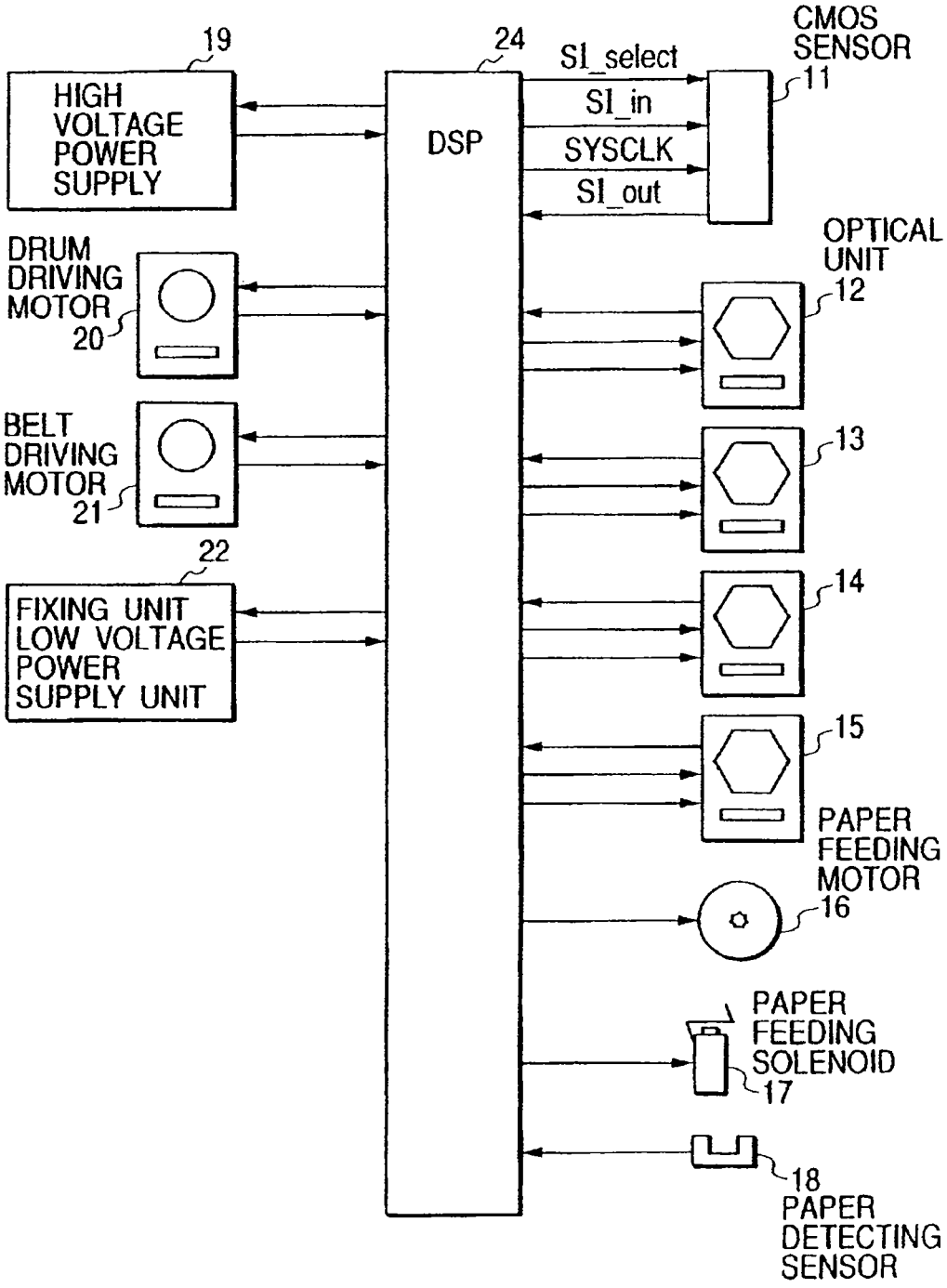
FIG. 10 is a control block diagram of a third example.

FIG. 10 is diagram showing composition of units controlled by a control CPU in an "image forming apparatus" according to a third example. The recording-material type determination apparatus used in this example is the same as the first example, and thus its description will be quoted.

In FIG. 10, reference numeral 24 denotes a digital signal processor. Reference numerals 11 to 22 denote the same components as those described in the second example, and thus description thereof will be omitted.

In this example, instead of the control CPU described in the second example, the digital signal processor (DSP) directly controls the image forming apparatus including motors as well as imaging information from the CMOS area sensor.

Recently, the performance of DSPs has been improved greatly. This has enabled real-time control including motor control as well as high-speed arithmetic processing of imaging information from CMOS area sensors, using a single DSP chip.

The image captured by the CMOS area sensor 11 is processed by the DSP 24 using the first calculation means and the second calculation means. Consequently, the DSP 24 variably controls control conditions of the high voltage power supply 19, fixing unit 22, drum driving motor 20 and belt driving motor 21.

This makes it possible to simplify and downsize the control circuit of the image forming apparatus. Also, DSP-based software control makes it possible to adjust calculation methods of the first calculation means and second calculation means flexibly.

For example, any contamination of the CMOS area sensor 11 or its lens with dust or other foreign matter may degrade the accuracy with which the surface characteristics of recording material are detected based on results of calculations carried out by the first calculation means and second calculation means.

The above problem can be solved by picking up an image of the recording material as a reference image before the recording material passes through the CMOS area sensor 11 and subtracting the reference image from a surface image of the recording material.

In this way, taking full advantage of the flexibility of DSP-based control, image forming apparatus according to this example can greatly improve the accuracy with which the type and surface characteristics of recording material are detected based on the calculations carried out by the first calculation means and second calculation means.

As described above, the present invention provides a recording-material type determination apparatus and recording-material type determination method which can determine the type of recording material using simple calculations as well as provides an image forming apparatus capable of obtaining stable image quality independent of the type of recording material using the apparatus and method. Also, since the present invention determines the type of recording material from two standpoints—namely, depth of irregularities in the surface of the recording material and spacing of irregularities on the surface of the recording material, it can determine the type of recording material more accurately.

The present invention has been described above citing a few preferred examples, but the present invention is not limited to these examples and it will be apparent that various modifications and applications are possible within the scope of the appended claims.

What is claimed is:

[1. A recording-material type determination apparatus comprising:

a light emit unit, adapted to illuminate a surface of recording material;

a read unit, adapted to read an illuminated region on the surface of the recording material as a video image;

a first calculation part adapted to calculate information about depth of irregularities in the surface of the recording material based on video information read by the read unit;

a second calculation part adapted to calculate information about spacing of irregularities on the surface of the recording material based on the video information read by the read unit; and a determination part adapted to determine a type of recording material based on calculation results produced by the first calculation part and the second calculation part.]

[2. A recording-material type determination apparatus according to claim 1, wherein the read unit is an area sensor including a plurality of pixels.]

[3. A recording-material type determination apparatus according to claim 1, wherein the read unit outputs a video image of the surface of the recording material as digital values.]

[4. A recording-material type determination apparatus according to claim 1, wherein the first calculation part quantitatively determines the depth of irregularities in the surface of the recording material by extracting a maximum value of contrast difference among pixels in a specific pixel region, from video information picked up by the read unit.]

[5. A recording-material type determination apparatus according to claim 1, wherein the second calculation part quantitatively determines the spacing of irregularities on the surface of the recording material by binarizing video information about pixels in a specific pixel region in video information picked up by the read unit and counting edge numbers in a binarized image.]

[6. A recording-material type determination apparatus according to claim 1, comprising:

a memory part adapted to prestore information about depth of irregularities and spacing of irregularities for each type of recording material, wherein the determination part determines the type of recording material by comparing the calculation results produced by the first calculation part and the second calculation part with information stored in the memory unit.]

[7. A recording-material type determination apparatus according to claim 1, wherein the first calculation part and the second calculation part consist of a DSP.]

[8. A recording-material type determination apparatus according to claim 1, wherein the determination part determines that the recording material is plain paper.]

[9. A recording-material type determination apparatus according to claim 1, wherein the determination part distinguishes whether the recording material is glossy paper or plain paper.]

[10. A recording-material type determination apparatus according to claim 1, wherein the determination part distinguishes whether the recording material is rough paper or plain paper.]

[11. A recording-material type determination apparatus according to claim 1, wherein the determination part distinguishes whether the recording material is OHT or plain paper.]

[12. A recording-material type determination apparatus comprising:

an input part adapted to input a video image of a surface of recording material;

a first calculation part adapted to calculate information about depth of irregularities in a surface of the recording material based on video information inputted in the input unit;

a second calculation part adapted to calculate information about spacing of irregularities on the surface of the recording material based on the video information inputted in the input unit; and a determination part adapted to determine a type of recording material based on calculation results produced by the first calculation part and the second calculation part.]

[13. A recording-material type determination method comprising:

a read step of reading a surface of recording material as a video image;

a first calculation step of calculating information about depth of irregularities in the surface of the recording material based on results of the read step;

a second calculation step of calculating information about spacing of irregularities on the surface of the recording material based on the results of the read step; and a determination step of determining a type of recording material based on calculation results produced in the first calculation step and the second calculation step.]

[14. A recording-material type determination method according to claim 13, wherein, in the read step, an area sensor including a plurality of pixels is used.]

[15. An image forming apparatus comprising:

a conveying part adapted to convey recording material;

an image forming part which forms an image on the recording material conveyed by the conveyor;

a light emit unit, adapted to illuminate a surface of recording material;

a read unit, adapted to read an illuminated region on the surface of the recording material as a video image;

a first calculation part adapted to calculate information about depth of irregularities in the surface of the recording material based on video information read by the read unit;

a second calculation part adapted to calculate information about spacing of irregularities on the surface of the recording material based on the video information read by the read unit;

a determination part adapted to determine a type of recording material based on calculation results produced by the first calculation part and the second calculation part; and a control part which controls image forming conditions of the image forming part based on the type of recording material determined by the determination part.]

[16. An image forming apparatus according to claim 15, wherein the image forming part comprises a developing part which develops a latent image on an image bearing member, a transferring part which transfers a visible image produced by the developing part to the recording material conveyed by the conveyor, and a fixing part which thermally fixes the visible image transferred to the recording material by the transferring part.]

[17. An image forming apparatus according to claim 15, wherein the image forming conditions controlled by the controller include at least one of developing conditions of the developing part, transfer conditions of the transferring part and fixing temperature for the fixing part. ]

[18. An image forming apparatus according to claim 15, wherein an image forming condition controlled by the control part is speed at which the recording material passes through the fixing part.]

*19. A recording material type determination apparatus comprising:*

*a sensor configured to read a surface image of a recording material, the surface image having pixels;*

*a calculation part configured to calculate difference information about irregularities in the surface of the recording material, wherein the calculation part generates a brightness difference between a bright portion and a dark portion in a pixel line of the surface image, and the difference information is obtained by using the brightness differences of plural pixel lines; and*

*a determination part configured to determine a type of the recording material based on the calculated difference information.*

*20. A recording material type determination apparatus according to claim 19,*

*wherein the calculated difference information includes a contrast value that is calculated by the calculation part with brightness information of the pixels of the surface image.*

*21. A recording material type determination apparatus according to claim 19,*

*wherein the sensor includes an area sensor that reads an area with a predetermined size of surface of the recording material as the surface image.*

*22. An image forming apparatus comprising:*

*an image forming part configured to form an image on a recording material;*

*a sensor configured to read a surface image of a recording material, the surface image having pixels;*

*a calculation part configured to calculate difference information about irregularities in the surface of the recording material, wherein the calculation part generates a brightness difference between a bright portion and a dark portion in a pixel line of the surface image, and the*

*difference information is obtained by using the brightness differences of plural pixel lines; and*

*a controller configured to control an image forming condition of the image forming part based on the calculated difference information about a depth of irregularities in the surface of the recording material.*

*23. An image forming apparatus according to claim 22, wherein the calculated difference information about the depth of irregularities in the surface of the recording material includes a contrast value that is calculated by the calculation part with the brightness information of the pixels of the surface image.*

*24. An image forming apparatus according to claim 22, wherein the sensor includes an area sensor that reads an area with a predetermined size of a surface of the recording material as the surface image.*

*25. An image forming apparatus according to claim 22, wherein the image forming part comprises an image bearing member, a developing part for developing an image on the image bearing member, a transferring part for transferring the image on the image bearing member to the recording material, a fixing part for fixing the image on the recording material, and*

*wherein the image forming condition includes at least one of a developing condition of the developing part and a transferring condition of the transferring part and fixing condition of the fixing part and a transport speed of the recording material.*

*26. A recording material type determination method comprising:*

*a read step of reading a surface image of a recording material, the surface image having pixels;*

*a calculation step of calculating difference information about irregularities in the surface of the recording material, wherein the calculation step includes a step of generating a brightness difference between a bright portion and a dark portion in a pixel line of the surface image and a step of using the brightness differences of plural pixel lines so that the difference information is obtained; and*

*a determination step of determining a type of the recording material based on the calculated difference information calculated in the calculation step.*

*27. A recording material type determination method according to claim 26,*

*wherein the calculated difference information includes a contrast value that is calculated in the calculating step with the brightness information of the pixels of the surface image.*

*28. A recording material type determination apparatus comprising:*

*a sensor configured to read a surface image of a recording material, the surface image having pixels;*

*a calculation part configured to calculate difference information about irregularities in the surface of the recording material, wherein the calculation part generates a brightness difference between a bright portion and a dark portion in a pixel line of the surface image, and the difference information is obtained by summing the brightness differences of plural pixel lines; and*

*a determination part configured to determine a type of the recording material based on the calculated difference information.*

*29. A recording material type determination apparatus according to claim 28,*

*wherein the sensor includes an area sensor that reads an area with a predetermined size of surface of the recording material as the surface image.*

*30. An image forming apparatus comprising:*

*an image forming part configured to form an image on a recording material;*

*a sensor configured to read a surface image of the recording material, the surface image having pixels;*

*a calculation part configured to calculate difference information about irregularities in the surface of the recording material, wherein the calculation part generates a brightness difference between a bright portion and a dark portion in a pixel line of the surface image, and the difference information is obtained by summing the brightness differences of plural pixel lines; and*

*a controller configured to control an image forming condition of the image forming part based on the calculated information.*

*31. An image forming apparatus according to claim 30, wherein the sensor includes an area sensor that reads an area with a predetermined size of surface of the recording material as the surface image.*

*32. An image forming apparatus according to claim 30, wherein the image forming part comprises an image bearing member, a developing part for developing an image on the image bearing member, a transferring part for transferring the image on the image bearing member to the recording material, and a fixing part for fixing the image on the recording material, and*

*wherein the image forming condition includes at least one of a developing condition of the developing part and a transferring condition of the transferring part and fixing condition of the fixing part and a transport speed of the recording material.*

*33. A recording material type determination method comprising:*

*a read step of reading a surface image of a recording material, the surface image having pixels;*

*a calculation step of calculating difference information about irregularities in the surface of the recording material, wherein the calculation step includes a step of generating a brightness difference between a brightest portion and a darkest portion in a pixel line of the surface image and a step of summing the brightness differences of plural pixel lines so that the difference information is obtained; and*

*a determination step of determining a type of the recording material based on the difference information calculated by the calculation step.*

*34. A recording material type determination apparatus for determining a surface condition of a recording material, comprising:*

*a sensor configured to read a surface image of the recording material, the surface image having pixels;*

*a calculation part configured to calculate information about a depth of irregularities in the surface of the recording material, wherein the calculation part generates a brightness difference between a brightest portion and a darkest portion in each pixel line among plural pixel lines of the surface image and the information is obtained by summing the brightness differences of the plural pixel lines; and*

*a determination part configured to determine a type of the recording material based on the calculated difference information.*

*35. A recording material type determination apparatus according to claim 34, wherein the sensor includes area sensor that reads an area with a predetermined size of surface of the recording material as the surface image.*

*36. An image forming apparatus comprising:*

*an image forming part configured to form an image on a recording material;*

*a sensor configured to read a surface image of the recording material, the surface image having pixels;*

*a calculation part configured to calculate information about a depth of irregularities in the surface of the recording material, wherein the calculation part generates brightness differences between a brightest portion and a darkest portion in each pixel line among plural pixel lines of the surface image and the information is obtained by summing the brightness differences of the plural pixel lines; and*

*a controller configured to control an image forming condition of the image forming part based on the calculated difference information.*

*37. An image forming apparatus according to claim 36, wherein the sensor includes an area sensor that reads an area with a predetermined size of surface of the recording material as the surface image.*

*38. An image forming apparatus according to claim 36, wherein the image forming part comprises an image bearing member, a developing part for developing an image on the image bearing member, a transferring part for transferring the image on the image bearing member to the recording material, and a fixing part for fixing the image on the recording material, and*

*wherein the image forming condition includes at least one of a developing condition of the developing part and a transferring condition of the transferring part and fixing condition of the fixing part and a transport speed of the recording material.*

*39. A recording material surface condition detection apparatus for determining a surface condition of a recording material, comprising:*

*a sensor configured to read a surface image of the recording material, the surface image having pixels;*

*a calculation part configured to calculate information about a depth of irregularities in the surface of the recording material, the calculation part generates brightness differences between a brightest portion and a darkest portion in each pixel line among plural pixel lines of the surface image and the information is obtained by summing the brightness differences of the plural pixel lines; and*

*a detection part configured to detect a condition of the surface of the recording material based on the information calculated by the calculation part.*

*40. A recording material surface condition detection apparatus according to claim 39, wherein the calculated information includes a contrast value that is calculated by the calculation part with brightness information of the pixels of the surface image.*

*41. A recording material surface condition detection apparatus according to claim 39, wherein the sensor includes an area sensor that reads an area with a predetermined size of surface of the recording material as the surface image.*

* * * * *